(12) United States Patent
Furukawa et al.

(10) Patent No.: US 10,508,224 B2
(45) Date of Patent: Dec. 17, 2019

(54) EASILY PEELABLE ADHESIVE TAPE, ARTICLE, AND METHOD FOR DISASSEMBLING ARTICLE

(71) Applicant: DIC Corporation, Tokyo (JP)

(72) Inventors: Tomo Furukawa, Kitaadachi-gun (JP); Hideaki Takei, Kitaadachi-gun (JP); Yumi Kagiyama, Kitaadachi-gun (JP); Yusuke Takahashi, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/778,048

(22) PCT Filed: Dec. 6, 2016

(86) PCT No.: PCT/JP2016/086165
§ 371 (c)(1),
(2) Date: May 22, 2018

(87) PCT Pub. No.: WO2017/104478
PCT Pub. Date: Jun. 22, 2017

(65) Prior Publication Data
US 2018/0340099 A1 Nov. 29, 2018

(30) Foreign Application Priority Data
Dec. 17, 2015 (JP) .................. 2015-246342

(51) Int. Cl.
| | |
|---|---|
| *B32B 43/00* | (2006.01) |
| *C09J 7/40* | (2018.01) |
| *B32B 7/02* | (2019.01) |
| *B32B 27/40* | (2006.01) |
| *C09J 5/00* | (2006.01) |
| *C09J 7/38* | (2018.01) |
| *C09J 7/25* | (2018.01) |
| *B32B 7/12* | (2006.01) |
| *C09J 7/20* | (2018.01) |
| *B32B 38/10* | (2006.01) |

(52) U.S. Cl.
CPC ............... *C09J 7/403* (2018.01); *B32B 7/02* (2013.01); *B32B 7/12* (2013.01); *B32B 27/40* (2013.01); *B32B 43/006* (2013.01); *C09J 5/00* (2013.01); *C09J 7/255* (2018.01); *C09J 7/385* (2018.01); *C09J 7/401* (2018.01); *B32B 38/10* (2013.01); *C09J 7/20* (2018.01); *C09J 2205/302* (2013.01); *C09J 2205/31* (2013.01); *C09J 2433/00* (2013.01); *C09J 2467/006* (2013.01); *C09J 2475/005* (2013.01); *C09J 2493/00* (2013.01); *Y10T 156/1158* (2015.01); *Y10T 156/1917* (2015.01)

(58) Field of Classification Search
CPC . B32B 38/10; B32B 43/006; Y10T 156/1158; Y10T 156/1917; C09J 7/20; C09J 7/385; C09J 7/401; C09J 7/403
USPC ................................... 156/712, 753
See application file for complete search history.

(56) References Cited

FOREIGN PATENT DOCUMENTS

| | | |
|---|---|---|
| JP | 10-140093 A | 5/1998 |
| JP | 2000-212530 A | 8/2000 |
| JP | 2002-141309 A | 5/2002 |
| JP | 2010-215769 A | 9/2010 |
| JP | 2010-225649 A | 10/2010 |
| JP | 2010-225650 A | 10/2010 |
| JP | 2013-98408 A | 5/2013 |
| JP | 2015-56446 A | 3/2015 |

OTHER PUBLICATIONS

International Search Report dated Jan. 24, 2017, issued in counterpart International Application No. PCT/JP2016/086165 (2 pages).

*Primary Examiner* — Mark A Osele
*Assistant Examiner* — Nickolas R Harm
(74) *Attorney, Agent, or Firm* — Westerman, Hattori, Daniels & Adrian, LLP

(57) ABSTRACT

[Object] An object of the present invention is to provide an easily peelable adhesive tape that has a good peel adhesive strength when attached to an adherend and that can be easily peeled after being irradiated with active energy rays.
[Solution] The present invention is directed to an easily peelable adhesive tape that has, on at least one surface of a base material, an active energy ray-curable layer having a storage modulus ($G'_{a25}$) of less than $1.0 \times 10^6$ Pa as measured at a temperature of 25° C. and a frequency of 1.0 Hz and has an adhesive layer on the surface side of the active energy ray-curable layer.

20 Claims, No Drawings

EASILY PEELABLE ADHESIVE TAPE, ARTICLE, AND METHOD FOR DISASSEMBLING ARTICLE

TECHNICAL FIELD

The present invention relates to an easily peelable adhesive tape that can be attached to an adherend or used to join two or more adherends and can be easily peeled after being irradiated with active energy rays.

BACKGROUND ART

Adhesive tapes are used as joining means offering high adhesion reliability to fix or temporarily fix components or used as labels for describing product information in various industrial fields pertaining to OA equipment, IT equipment, electrical machines such as home appliance, and automobiles.

In recent years, there has been an increasing demand for recycle and reuse of exhausted products in industrial fields pertaining to such electrical machines and automobiles from a viewpoint of conservation of the global environment. The recycle and reuse of exhausted products need a work for peeling adhesive tapes used to fix components or used as labels. Such adhesive tapes, however, are attached to various points in products and often exert strong adhesion. The work for peeling the adhesive tapes may be associated with considerable complication.

For example, an adhesive member having two or more adhesive layers with different adhesive strengths is disclosed as an adhesive tape that can be relatively easily peeled (see, for example, PTL 1). When the adhesive member having adhesive layers forming a laminate structure is attached to an adherend through a weak adhesive layer, the adhesive member achieves strong adhesion to the adherend and easy disassembling with the weak adhesive layer being a release surface.

The adhesive member, however, has an issue of high production costs because the adhesive member has plural adhesive layers as an essential structure. The adhesive member also has a limitation in increasing the adhesive strength since the adhesive member is configured to adhere to an adherend through the weak adhesive layer. This configuration may make it difficult for the adhesive member to be used to strongly fix an article.

CITATION LIST

Patent Literature

PTL 1: Japanese Unexamined Patent Application Publication No. 10-140093

SUMMARY OF INVENTION

Technical Problem

The present invention is directed to an easily peelable adhesive tape that has a good peel adhesive strength when attached to an adherend and that can be easily peeled after being irradiated with active energy rays.

Solution to Problem

The inventors of the present invention accomplish the present invention by providing an easily peelable adhesive tape that has, on at least one surface of a base material, an active energy ray-curable layer having a storage modulus $(G'_{a25})$ of less than $1.0 \times 10^6$ Pa as measured at a temperature of 25° C. and a frequency of 1.0 Hz and has an adhesive layer on the surface side of the active energy ray-curable layer.

Advantageous Effects of Invention

Since the easily peelable adhesive tape of the present invention strongly adheres to an adherend, the adhesive tape is unlikely to cause detachment of the adherend over time or the like. The easily peelable adhesive tape is configured such that the active energy ray-curable layer is cured into a cured layer upon irradiation with active energy rays. The easily peelable adhesive tape having the cured layer can be easily peeled off from the adherend.

DESCRIPTION OF EMBODIMENTS

The easily peelable adhesive tape of the present invention has, on at least one surface of a base material, an active energy ray-curable layer having a storage modulus $(G'_{a25})$ of less than $1.0 \times 10^6$ Pa as measured at a temperature of 25° C. and a frequency of 1.0 Hz and has an adhesive layer on the surface side of the active energy ray-curable layer.

Since the easily peelable adhesive tape has a good peel adhesive strength when attached to an adherend, the adhesive tape can effectively avoid separation of the adherend or the like. The easily peelable adhesive tape can be easily peeled after being irradiated with active energy rays.

The easily peelable adhesive tape having an active energy ray-curable layer, which is uncured before irradiation with the active energy ray, is configured such that the adhesive layer strongly adheres to an adherend when the adhesive tape is attached to the adherend. The adhesive tape itself is relatively flexible. These properties make it difficult to break the adhesion between the adherend and the adhesive layer or to perform peeling in an attempt to peel the easily peelable adhesive tape off from the adherend.

The hardness of the easily peelable adhesive tape having the cured layer described below famed by irradiation with active energy rays increases with increasing hardness of the cured layer. This configuration makes it easy to remove the thin adhesive layer together with the cured layer from the surface of the adherend in an attempt to peel the easily peelable adhesive tape off from the adherend. As a result, the easily peelable adhesive tape is easy to peel off from the adherend.

Examples of the embodiments of the easily peelable adhesive tape of the present invention include a one-sided adhesive tape having the active energy ray-curable layer on one surface of the base material and an adhesive layer on the surface of the active energy ray-curable layer; a double-sided adhesive tape having the active energy ray-curable layer on each surface of the base material and an adhesive layer on the surface of each active energy ray-curable layer; and a double-sided adhesive tape having the active energy ray-curable layer on one surface of the base material, an adhesive layer on the surface of the active energy ray-curable layer, and an adhesive layer on the other surface of the base material. The easily peelable adhesive tape is preferably the one-sided adhesive tape in order to maintain a good peeling property after irradiation with active energy rays.

The active energy ray-curable layer and the adhesive layer may each be formed of a single layer or formed by stacking two or more identical or different layers on top of each other.

First, the active energy ray-curable layer in the easily peelable adhesive tape of the present invention will be described.

The active energy ray-curable layer is a layer that can be cured by irradiation with active energy rays. The active energy ray-curable layer refers to a uncured layer before the irradiation. The active energy ray-curable layer is the uncured layer or a partially cured layer in order that the easily peelable adhesive tape of the present invention exerts a good peel adhesive strength when attached to an adherend.

The active energy ray-curable layer has a storage modulus ($G'_{a25}$) of less than $1.0 \times 10^6$ Pa as measured at a temperature of the active energy ray-curable layer of 25° C. and a frequency of 1.0 Hz in order that the easily peelable adhesive tape has a good peel adhesive strength when attached to an adherend.

The active energy ray-curable layer preferably has a storage modulus ($G'_{a25}$) of less than $1.0 \times 10^6$ Pa and preferably has a storage modulus ($G'_{a25}$) of $5.0 \times 10^5$ Pa or less in order that the easily peelable adhesive tape has a good peel adhesive strength when attached to an adherend. The lower limit of the elastic modulus ($G'_{a25}$) is preferably, but not necessarily, $1.0 \times 10^4$ Pa.

To obtain an easily peelable adhesive tape that can be easily peeled with small force, the active energy ray-curable layer is preferably a layer that, upon irradiation with active energy rays, is cured to form a cured layer having a storage modulus ($G'_{b25}$) of $1.0 \times 10^6$ Pa or more as measured at a temperature of 25° C. and a frequency of 1.0 Hz, more preferably a layer that can form a cured layer having a storage modulus ($G'_{b25}$) of $1.0 \times 10^6$ Pa or more and $1.0 \times 10^8$ Pa or less, and still more preferably a layer that can form a cured layer having a storage modulus ($G'_{b25}$) of $1.0 \times 10^7$ Pa or less.

The storage modulus ($G'_{a25}$) and the storage modulus ($G'_{a25}$) at 25° C. can be obtained using a viscoelasticity testing machine (available from Rheometrics, Inc., product name: ARES-2KSTD) as follows: placing a test piece between parallel disks in a measuring unit of the testing machine; and measuring the storage modulus and the loss modulus at a temperature of 25° C. and a frequency of 1 Hz. The test piece used in the measurement is a test piece obtained by cutting the active energy ray-curable layer in a circular shape that measures 1 mm in thickness and 8 mm in diameter.

The active energy ray-curable layer preferably has a functional group (e.g., hydroxyl group) reactive with a functional group (e.g., isocyanate group) of the adhesive layer described below in order to obtain a better adhesive strength and prevent separation over time.

Examples of the functional group that the active energy ray-curable layer may have include thermally reactive functional groups, such as a hydroxyl group. In this case, the adhesive layer is preferably an adhesive layer having a thermally reactive functional group, such as an isocyanate group.

The active energy ray-curable layer is preferably a layer containing, for example, an epoxy resin, an acrylic acrylate, or a polyurethane having the thermally reactive functional group and an active energy ray-curable functional group, such as an acryloyl group, and more preferably a layer containing a polyurethane having the thermally reactive functional group and an active energy ray-curable functional group, such as an acryloyl group.

The polyurethane having the thermally reactive functional group and an active energy ray-curable functional group, such as an acryloyl group is preferably, for example, a polyurethane (a1) which is a reaction product between a polyurethane (a1') having an isocyanate group and a (meth) acrylic monomer having a functional group (e.g., hydroxyl group) reactive with the isocyanate group.

The polyurethane (a1') having an isocyanate group is preferably a reaction product between a polyol (a1-1) and a polyisocyanate (a1-2).

Examples of the polyol (a1-1) include polycarbonate polyols, polyester polyols, and polyether polyols.

Examples of the polycarbonate polyols include polyols produced by reaction between a carbonic acid ester and/or phosgene and a low-molecular-weight polyol described below.

Examples of the carbonic acid ester include methyl carbonate, dimethyl carbonate, ethyl carbonate, diethyl carbonate, cyclocarbonates, and diphenyl carbonate.

Examples of the low-molecular-weight polyol reactive with the carbonic acid ester or phosgene include ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, 1,4-cyclohexanedimethanol, hydroquinone, resorcin, bisphenol A, bisphenol F, and 4,4'-biphenol.

The polyester polyol that can be used as the polyol (a1-1) is, for example, a polyester polyol produced by the esterification reaction between a low-molecular-weight polyol and a polycarboxylic acid, a polyester produced by the ring-opening polymerization reaction of a cyclic ester compound, such as ε-caprolactone, or a copolyester of the foregoing.

Examples of the low-molecular-weight polyol include aliphatic alkylene glycols having a molecular weight of about 50 to about 300, such as ethylene glycol, propylene glycol, 1,4-butanediol, 1,6-hexanediol, diethylene glycol, neopentyl glycol, and 1,3-butanediol; and cyclohexane dimethanol.

Examples of the polycarboxylic acid that can be used to produce the polyester polyol include aliphatic dicarboxylic acids, such as succinic acid, adipic acid, sebacic acid, and dodecanedicarboxylic acid; aromatic dicarboxylic acids, such as terephthalic acid, isophthalic acid, phthalic acid, and naphthalenedicarboxylic acid; and anhydrides or esterification products thereof.

The polyol (a1-1) may be a polyether polyol. The polyether polyol may be a polyether polyol produced by addition polymerization of an alkylene oxide using, as an initiator, one or two or more compounds having two or more active hydrogen atoms. The polyether polyol may be, for example, polypropylene glycol.

The polyol (a1-1) may be either one of the forgoing or other polyols. Examples of other polyols include acrylic polyols.

Examples of the polyisocyanate (a1-2) include alicyclic polyisocyanates, aliphatic polyisocyanates, and aromatic polyisocyanates, with alicyclic polyisocyanates being preferably used.

Examples of the alicyclic polyisocyanates include isophorone diisocyanate, 1,3-bis(isocyanatomethyl)cyclohexane, 4,4'-dicyclohexylmethane diisocyanate, 2,4- and/or 2,6-methylcyclohexane diisocyanate, cyclohexylene diisocyanate, methylcyclohexylene diisocyanate, bis(2-isocyanatoethyl)-4-cyclohexylene-1,2-dicarboxylate, 2,5- and/or 2,6-norbornane diisocyanate, dimer acid diisocyanate, and bicycloheptane triisocyanate. The alicyclic polyisocyanates may be used alone or in combination of two or more.

Examples of the method for producing the polyurethane (a1') having an isocyanate group by causing reaction between the polyol (a1-1) and the polyisocyanate (a1-2) include a method involving heating the polyol (a1-1) in a reactor under a normal pressure or reduced pressure condition to remove water and then supplying the polyisocyanate (a1-2) at a time or in small quantities to cause the reaction.

In the reaction between the polyol (a1-1) and the polyisocyanate (a1-2), the equivalent ratio ([equivalent ratio of NCO/OH]) of the isocyanate group of the polyisocyanate (a1-2) to the hydroxyl group of the polyol (a1-1) is preferably in the range from 1.1 to 20.0, more preferably in the range from 1.1 to 13.0, still more preferably in the range from 1.1 to 5.0, and yet still more preferably in the range from 1.5 to 3.0.

The conditions (e.g., temperature, time) of the reaction between the polyol (a1-1) and the polyisocyanate (a1-2) are appropriately set in consideration of various conditions, such as safety, quality, and costs. Although the conditions are not limited, for example, the reaction temperature is preferably in the range from 70° C. to 120° C., and the reaction time is preferably in the range from 30 minutes to 5 hours.

In the reaction between the polyol (a1-1) and the polyisocyanate (a1-2), for example, a tertiary amine catalyst or an organic metal catalyst can be used as a catalyst if necessary.

The reaction may be carried out in a solvent-free environment or in the presence of an organic solvent.

Examples of the organic solvent include ester solvents, such as methyl acetate, ethyl acetate, propyl acetate, and butyl acetate; ketone solvents, such as acetone, methyl ethyl ketone, methyl butyl ketone, and cyclohexanone; ether ester solvents, such as methyl cellosolve acetate and butyl cellosolve acetate; aromatic hydrocarbon solvents, such as toluene and xylene; and amide solvents, such as dimethylformamide and dimethylacetamide. The organic solvent may be used alone or in combination of two or more. The organic solvent may be removed by using a suitable method, such as heating under reduced pressure or drying under normal pressure, in the middle of production of the polyurethane (a1') or after production of the polyurethane (a1').

The polyurethane (a1') having an isocyanate group produced in the aforementioned method is preferably the polyurethane (a1') having a softening temperature of 40° C. or higher and more preferably the polyurethane (a1') having a softening temperature of 50° C. or higher. The softening temperature refers to a value measured in conformity with JIS K 2207. The upper limit of the softening temperature is preferably 100° C. or lower.

The polyurethane (a1) that can be used in the present invention can be produced by reaction between the polyurethane (a1') having an isocyanate group produced in the aforementioned method and a (meth)acrylic monomer having a functional group reactive with the isocyanate group. Specifically, the polyurethane (a1) can be produced by mixing the polyurethane (a1') produced in the aforementioned method or an organic solvent solution thereof and the (meth)acrylic monomer to cause the reaction.

The (meth)acrylic monomer may be a (meth)acrylic monomer having, for example, a hydroxy group, an amino group, a carboxyl group, or a mercapto group as a functional group reactive with an isocyanate group and is preferably a (meth)acrylic monomer having a hydroxyl group or an amino group.

Examples of the (meth)acrylic monomer include 2-hydroxyethyl (meth)acrylate, 2-hydroxypropyl (meth)acrylate, 3-hydroxypropyl (meth)acrylate, 4-hydroxybutyl (meth)acrylate, 2-hydroxy-3-phenoxypropyl (meth)acrylate, pentaerythritol tri(meth)acrylate, butanediol mono(meth)acrylate, a caprolactone modified product of 2-hydroxyethyl (meth)acrylate, glycidyl di(meth)acrylate; and dimethylaminoethyl (meth)acrylate, and diethylaminoethyl (meth)acrylate. The (meth)acrylic monomer may be used alone or in combination of two or more.

The (meth)acrylic monomer is preferably used in an amount from 5 parts by mass to 20 parts by mass, and more preferably used in an amount from 5 parts by mass to 15 parts by mass with respect to 100 parts by mass of the polyurethane (a1').

In the reaction between the polyurethane (a1') and the (meth)acrylic monomer, a urethanization catalyst can be used if necessary. The urethanization catalyst can be appropriately added in a given stage of the urethanization reaction. The urethanization reaction is preferably carried out until the isocyanate group content (%) becomes substantially constant.

Examples of the urethanization catalyst include nitrogen-containing compounds, such as triethylamine, triethylenediamine, and N-methylmorpholine; organic metal salts, such as potassium acetate, zinc stearate, and stannous octoate; and organometallic compounds, such as dibutyltin dilaurate.

The polyurethane (a1) having a polymerizable unsaturated double bond produced in the aforementioned method is cured by radical polymerization of the polymerizable unsaturated double bond, such as that of a (meth)acryloyl group, upon irradiation with active energy rays.

In the production of the active energy ray-curable layer using the polyurethane (a1), an active energy ray-curable composition containing the polyurethane (a1), a radical polymerization initiator (a2), and other active energy ray-curable compounds can be used.

Examples of the radical polymerization initiator (a2) include known radical polymerization initiators such as photopolymerization initiators and peroxide. A photopolymerization initiator is preferred in order to maintain, for example, high productivity.

Examples of the photopolymerization initiator (a2) include conventionally known photopolymerization initiators, for example, alkylphenone photopolymerization initiators, such as benzophenone, a camphorquinone photopolymerization initiator, acylphosphine oxide photopolymerization initiators, and titanocene photopolymerization initiators.

Examples of commercial products of the photopolymerization initiator include thioxanthones, such as benzophenone, 4,4-bis(diethylamino)benzophenone, 2,4,6-trimethylbenzophenone, methylorthobenzoylbenzoate, 4-phenylbenzophenone, t-butylanthraquinone, 2-ethylanthraquinone, 2,4-diethylthioxanthone, isopropylthioxanthone, and 2,4-dichlorothioxanthone; acetophenones, such as diethoxyacetophenone, 2-hydroxy-2-methyl-1-phenyl-propan-1-one (e.g., Darocure 1173 available from Ciba Specialty Chemicals plc.), benzyldimethylketal, 1-hydroxycyclohexyl-phenyl ketone (e.g., Irgacure 184 available from Ciba Specialty Chemicals plc.), 1-[4-(2-hydroxyethoxy)-phenyl]-2-hydroxy-2-methyl-1-propan-1-one (e.g., Irgacure 2959 available from Ciba Specialty Chemicals plc.), 2-methyl-2-morpholino(4-thiomethylphenyl)propan-1-one (e.g., Irgacure 907 available from Ciba Specialty Chemicals plc.), 2-benzyl-2-dimethylamino-1-(4-morpholinophenyl)-butanone; benzoin ethers, such as benzoin methyl ether, benzoin ethyl ether, benzoin isopropyl ether, and benzoin isobutyl ether; acylphosphine oxides, such as 2,4,6-trimethylbenzoyl diphenylphosphine oxide, bis(2,6-dimethoxybenzoyl)-2,4,4-trimethylpentyl phosphine oxide, bis(2,4,6-trimethylbenzoyl)-phenylphosphine oxide; methyl benzoylformate (e.g., Vicure 55 available from Stauffer Chemical Company), 1,7-bisacridinylheptane, 9-phenylacridine, Quantacure (available from International Biosynthetics Ltd.), Kayacure-MBP (available from Nippon Kayaku Co., Ltd.), Esacure-BO (available from Fratelli Lamberti), Trigonal 14 (available from Akzo N.V.), Irgacure (available from Ciba-Geigy AG), Darocur (available from Ciba-Geigy AG), Speed Cure (available from Ciba-Geigy AG), and a mixture of Darocur 1173 and Fi-4 (available from Eastman). The photopolymerization initiator may be used alone or in combination of two or more.

The photopolymerization initiator is preferably, for example, Irgacure 184 or Irgacure 651, which causes rapid curing upon irradiation with active energy rays, such as ultraviolet rays.

The radical polymerization initiator (a2) is preferably used in an amount from 0.5 parts by mass to 5 parts by mass, and more preferably used in an amount from 1 part by mass to 3 parts by mass with respect to 100 parts by mass of the polyurethane (a1).

The active energy ray-curable composition may be an active energy ray-curable composition containing a known polyisocyanate and a known multi-functional (meth)acrylate compound if necessary. The "multi-functional" means having two or more polymerizable unsaturated double bonds in a molecule.

Examples of the polyisocyanate include polyisocyanates of, for example, tolylene diisocyanate, chlorophenylene diisocyanate, hexamethylene diisocyanate, tetramethylene diisocyanate, xylylene diisocyanate, isophorone diisocyanate, diphenylmethane diisocyanate, and hydrogenated diphenylmethane diisocyanate; trimethylolpropane adducts of the foregoing; isocyanurates of the foregoing; and biurets of the foregoing.

The polyisocyanate is preferably used in an amount from 0.1 parts by mass to 10 parts by mass, and more preferably used in an amount from 0.5 parts by mass to 7 parts by mass with respect to 100 parts by mass of the polyurethane (a1) in order to impart a high cohesive force.

Examples of the multi-functional (meth)acrylate compound include those having two to four polymerizable unsaturated double bonds, for example, (meth)acrylates, such as poly(ethylene glycol) di(meth)acrylate, tripropylene glycol di(meth)acrylate, neopentyl glycol hydroxypivarate di(meth)acrylate, ditrimethylolpropane tetra(meth)acrylate, neopentyl glycol di(meth)acrylate, 1,6-hexanediol di(meth)acrylate, trimethylolpropane tri(meth)acrylate, pentaerythritol tri(meth)acrylate, and pentaerythritol tetra(meth)acrylate, and (meth)acrylate esters of sugar alcohols, such as sorbitol. The multi-functional (meth)acrylate compound may be used alone or in combination of two or more.

The multi-functional (meth)acrylate compound is preferably used in an amount from 5 parts by mass to 30 parts by mass, and more preferably used in an amount from 10 parts by mass to 25 parts by mass with respect to 100 parts by mass of the polyurethane (a1).

The active energy ray-curable composition and the active energy ray-curable layer may further contain an additive if necessary in addition to the polyurethane (a1).

Examples of the additive include a silane coupling agent, a phosphate additive, an acrylate additive, a tackifier, a light stabilizer, an anti-aging agent, a peel strength modifier, a plasticizer, a softener, a filler, a colorant, and a surfactant.

The thickness of the active energy ray-curable layer is preferably 10 µm or more, more preferably from 15 µm to 75 µm, and still more preferably from 25 µm to 50 µm in order to rarely cause detachment of the adherend over time or the like because of strong adhesion to an adherend and easily peel the easily peelable adhesive tape off from the adherend with small force after irradiation with active energy rays.

Next, the adhesive layer in the easily peelable adhesive tape of the present invention will be described.

To obtain an easily peelable adhesive tape that rarely causes detachment of an adherend over time or the like because of good peel adhesive strength against the adherend and that can be easily peeled off with relatively small force when peeled after irradiation with active energy rays, the thickness of the adhesive layer is preferably 3 µm or less and particularly preferably 1.5 µm or less. The lower limit of the thickness of the adhesive layer is preferably 0.1 µm and preferably 0.5 µm in order to exert good peel adhesive strength.

The adhesive layer may contain an acrylic polymer or an adhesive resin such as a urethane resin. In particular, the adhesive layer is preferably an acrylic adhesive layer containing an acrylic polymer in order to obtain an easily peelable adhesive tape that rarely causes detachment of an adherend over time or the like because of good peel adhesive strength against the adherend and that can be easily peeled off with relatively small force when peeled.

The acrylic adhesive layer may be formed, for example, by using an adhesive composition containing an acrylic polymer and, if necessary, a crosslinker and the like.

The acrylic polymer may be an acrylic polymer produced by polymerization of a (meth)acrylic monomer. Examples of the (meth)acrylic monomer include (meth)acrylates. An adhesive composition containing a (meth)acrylate having an alkyl group with 2 to 14 carbon atoms is preferably used in order to ensure tack strength and adhesive strength.

Examples of the (meth)acrylate having an alkyl group with 2 to 14 carbon atoms include ethyl acrylate, n-propylacrylate, isopropyl acrylate, n-butyl acrylate, sec-butyl acrylate, t-butyl acrylate, n-hexyl acrylate, cyclohexyl acrylate, n-octyl acrylate, isooctyl acrylate, 2-ethylhexyl acrylate, isononyl acrylate, isodecyl acrylate, lauryl acrylate, methyl methacrylate, ethyl methacrylate, n-propyl methacrylate, isopropyl methacrylate, n-butyl methacrylate, sec-butyl methacrylate, t-butyl methacrylate, n-hexyl methacrylate, cyclohexyl methacrylate, n-octyl methacrylate, isooctyl methacrylate, 2-ethylhexyl methacrylate, isononyl methacrylate, isodecyl methacrylate, and lauryl methacrylate.

In particular, the (meth)acrylate is preferably an alkyl (meth)acrylate having an alkyl group with 4 to 9 carbon atoms.

The alkyl acrylate having an alkyl group with 4 to 9 carbon atoms is more preferably n-butyl acrylate, isooctyl acrylate, 2-ethylhexyl acrylate, cyclohexyl acrylate, isononyl acrylate, or ethyl acrylate in order to ensure good peel adhesive strength regardless of the type of adherend.

The (meth)acrylate having an alkyl group with 2 to 14 carbon atoms is preferably used in an amount from 90 mass % to 99 mass %, and more preferably used in an amount from 90 mass % to 96 mass % with respect to the total amount of the (meth)acrylic monomer.

The acrylic polymer may be an acrylic polymer having a polar group, such as a hydroxyl group, a carboxyl group, or an amide group.

The acrylic polymer can be produced by polymerizing a (meth)acrylic monomer containing a (meth)acrylic monomer having a polar group, such as a hydroxyl group, a carboxyl group, or an amide group.

Examples of the (meth)acrylic monomer having a hydroxyl group include 2-hydroxyethyl (meth)acrylate, 4-hydroxybutyl (meth)acrylate, 6-hydroxyhexyl (meth)acrylate, hydroxypropyl (meth)acrylate, caprolactone-modified (meth)acrylate, polyethylene glycol mono(meth)acrylate, and polypropylene glycol mono(meth)acrylate. In particular, the (meth)acrylic monomer having a hydroxyl group is preferably 2-hydroxyethyl (meth)acrylate, 4-hydroxybutyl (meth)acrylate, or 6-hydroxyhexyl (meth)acrylate.

Examples of the (meth)acrylic monomer having a carboxyl group include acrylic acid, methacrylic acid, itaconic acid, maleic acid, crotonic acid, a dimer of acrylic acid or methacrylic acid, and ethylene-oxide modified succinate acrylate. In particular, the (meth)acrylic monomer having a carboxyl group is preferably acrylic acid.

Examples of the (meth)acrylic monomer having an amide group include N-vinyl-2-pyrrolidone, N-vinylcaprolactam, acryloylmorpholine, acrylamide, N,N-dimethylacrylamide, and 2-(perhydrophthalimid-N-yl)ethyl acrylate. In particular, the (meth)acrylic monomer having an amide group is preferably N-vinyl-2-pyrrolidone, N-vinylcaprolactam, and acryloyl morpholine.

Examples of the vinyl monomer having other polar groups include vinyl acetate, acrylonitrile, maleic anhydride, and itaconic anhydride.

The (meth)acrylic monomer having a polar group is preferably used in an amount from 0.1 mass % to 20 mass %, more preferably used in an amount from 1 mass % to 13 mass %, and still more preferably used in an amount from 1.5 mass % to 8 mass % with respect to the total amount of the (meth)acrylic monomer used to produce the acrylic polymer, in order to control cohesive force, holding power, tack amount, and adhesive strength in suitable ranges.

The weight-average molecular weight of the acrylic polymer is preferably 400,000 to 2,000,000, and more preferably 600,000 to 1,800,000 in order to obtain an easily peelable adhesive tape that rarely causes detachment of an adherend over time or the like because of good peel adhesive strength against the adherend and that can be easily peeled off with relatively small force when peeled.

[Method for Measuring Weight-Average Molecular Weight]

The weight-average molecular weight described in the present invention is a polystyrene-equivalent value measured by gel permeation chromatography (GPC) under the following conditions.

Resin sample solution: 0.4 mass % tetrahydrofuran (THF) solution

Measurement apparatus model number: HLC-8220GPC (available from Tosoh Corporation)

Column: TSKgel (available from Tosoh Corporation)

Eluent: tetrahydrofuran (THF)

The adhesive composition preferably contains a crosslinker in addition to the acrylic polymer in order to further increase cohesive force. This composition provides an easily peelable adhesive tape that rarely causes detachment of an adherend over time or the like because of good peel adhesive strength against the adherend and that can be easily peeled off with relatively small force when peeled.

Examples of the crosslinker include isocyanate crosslinkers, epoxy crosslinkers, and chelate crosslinkers.

The crosslinker is preferably used such that the gel fraction of the adhesive layer to be formed is in the range from 25 mass % to 80 mass %, more preferably used such that the gel fraction is in the range from 40 mass % to 75 mass %, and still more preferably used such that the gel fraction is in the range from 50 mass % to 75 mass % in order to obtain an easily peelable adhesive tape that rarely causes detachment of an adherend over time or the like because of good peel adhesive strength against the adherend and that can be easily peeled off with relatively small force when peeled. The gel fraction in the present invention is obtained as follows: immersing the cured adhesive layer in toluene and leaving the adhesive tape in toluene for 24 hours; then measuring the mass of the undissolved part of the adhesive layer after drying; and calculating a percentage of the mass relative to the original mass as a gel fraction.

The adhesive composition may further contain a tackifier resin in order to further increase adhesive strength.

The tackifier resin is preferably used in an amount from 10 parts by mass to 60 parts by mass, and more preferably used in an amount from 15 parts by mass to 50 parts by mass with respect to 100 parts by mass of the acrylic polymer in order to impart suitable adhesive strength.

The adhesive composition may further contain publicly known additives in addition to the forgoing.

Examples of the additives include a plasticizer, a softener, a filler, a pigment, and a flame retardant if necessary.

Next, the base material in the easily peelable adhesive tape of the present invention will be described.

The base material functions as a support (core) of the easily peelable adhesive tape of the present invention and also increases ease of peeling in peeling the easily peelable adhesive tape after irradiation with active energy rays.

The thickness of the base material is preferably 25 µm or more, preferably 25 µm to 250 µm, and preferably 40 µm to 150 µm in order to rarely cause detachment of an adherend over time or the like because of strong adhesion to an adherend and easily peel the easily peelable adhesive tape off from the adherend after irradiation with active energy rays.

The easily peelable adhesive tape of the present invention can be produced through, for example, a step [1] of forming an active energy ray-curable layer, which is substantially uncured, by applying an active energy ray-curable composition, which will form the active energy ray-curable layer, to one surface or each surface of a base material, followed by drying or the like if necessary; a step [2] of forming an adhesive layer by applying the adhesive composition on the surface of a release liner, followed by drying or the like if necessary; and a step [3] of stacking the active energy ray-curable layer and the adhesive layer on top of each other.

Examples of the method for applying the active energy ray-curable composition to the base material in the step [1] include a gravure coating method, a roll coating method, a comma coating method, an air knife coating method, a kiss coating method, a spray coating method, a traverse coating method, a spinner coating method, a wheeler coating method, a brush coating method, a solid color coating method through a silk screen, a wire bar coating method, a flow coating method, an offset printing method, a typographic printing method, and an extrusion method.

The drying can be suitably performed, for example, when the active energy ray-curable composition contains a solvent. The drying is appropriately set in consideration of various conditions, such as safety, quality, and costs. Although the drying conditions are not limited, for example, the drying temperature is preferably in the range from 60° C. to 120° C., and the drying time is preferably in the range from 30 seconds to 10 minutes in order to produce an active energy ray-curable layer, which is not active-energy-ray-cured (uncured).

Examples of the method for applying the adhesive composition to a release liner in the step [2] include a gravure coating method, a roll coating method, a comma coating method, an air knife coating method, a kiss coating method, a spray coating method, a traverse coating method, a spinner coating method, a wheeler coating method, a brush coating method, a solid color coating method through a silk screen, a wire bar coating method, a flow coating method, an offset printing method, a typographic printing method, and an extrusion method.

After application of the adhesive composition, drying or the like may be performed if necessary. The drying can be suitably performed, for example, when the adhesive composition contains a solvent. The drying is appropriately set in consideration of various conditions, such as safety, quality, and costs. Although the drying conditions are not limited, for example, the drying temperature is preferably in the range from 60° C. to 120° C., and the drying time is preferably in the range from 30 seconds to 10 minutes.

Examples of the method for attaching a stacked product of the base material and the active energy ray-curable layer and a stacked product of the release liner and the adhesive layer to each other in the step [3] include a method involving bringing the active energy ray-curable layer into contact with the adhesive layer and performing pressure-bonding and curing or the like.

The total thickness of the easily peelable adhesive tape of the present invention produced in the aforementioned method is preferably 40 µm to 350 µm, and more preferably 50 µm to 250 µm.

The easily peelable adhesive tape of the present invention can be attached to various types of adherends and can be used to join two or more adherends.

Examples of the adherends include plate-shaped rigid bodies, such as stainless plates and glass, and relatively flexible resin films, such as those made of, for example, polyethylene terephthalate, polybutylene terephthalate, polyethylene naphthalate, polyethylene, polypropylene, cellophane, diacetyl cellulose, triacetyl cellulose, cellulose acetyl butyrate, polyvinyl chloride, polyvinylidene chloride, polyvinyl alcohol, ethylene-vinylacetate copolymer, polystyrene, polycarbonate, polymethylpentene, polysulfone, polyether ether ketone, polyether sulfone, polyetherimide, polyimide, fluororesin, nylon, acrylic resin, and silicon dioxide.

Examples of articles in which the easily peelable adhesive tape is attached to adherends include electronic devices, such as liquid crystal displays, personal computers, mobile phones, and OA equipment, and parts used in electronic devices.

Next, a method for disassembling the article will be described.

Examples of the disassembling method include a method including a step of irradiating the easily peelable adhesive tape of the article with active energy rays to cure the active energy ray-curable layer into a cured layer having a storage modulus ($G'_{b25}$) of $1.0 \times 10^6$ Pa or more as measured at a temperature of 25° C. and a frequency of 1.0 Hz, and a step of peeling the easily peelable adhesive tape having the cured layer from the adherend.

The irradiation with active energy rays may be performed directly on the easily peelable adhesive tape or the active energy ray-curable layer of the easily peelable adhesive tape. When the adherend in the article has transparency, the irradiation with active energy rays may be performed on the easily peelable adhesive tape or the active energy ray-curable layer through the adherend.

The active energy rays are preferably ultraviolet rays. In order that the curing reaction induced by the ultraviolet rays proceeds efficiently, the ultraviolet rays may be applied in an inert gas atmosphere, such as a nitrogen gas atmosphere, or in an air atmosphere.

When the active energy rays are ultraviolet rays, examples of irradiation devices include a low-pressure mercury lamp, a high-pressure mercury lamp, an extra-high pressure mercury lamp, a metal halide lamp, an electrodeless lamp (fusion lamp), a chemical lamp, a black light lamp, a mercury-xenon lamp, a short arc lamp, a helium-cadmium laser, an argon laser, sunlight, and LED. A xenon flash lamp capable of flashily emitting active energy rays is preferred because the xenon flash lamp can minimize the effect of heat on the base material.

Examples of the active energy ray-irradiation device include, in addition to the foregoing, a germicidal lamp, a carbon arc lamp, a xenon lamp, a metal halide lamp, and scanning-type and curtain-type electron beam accelerators.

The irradiation with active energy rays using the aforementioned method cures the active energy ray-curable layer into a cured layer having a storage modulus ($G'_{a25}$) of $1.0 \times 10^6$ Pa or more as measured at a temperature of 25° C. and a frequency of 1.0 Hz.

Next, the easily peelable adhesive tape having the cured layer is peeled off from the adherend. At this time, the easily peelable adhesive tape is preferably pulled at an angle of 90° to 150° with respect to the plane of the adherend in order to easily peel the easily peelable adhesive tape off with small force.

The present invention will be described below in more detail by way of Examples and Comparative Examples.

EXAMPLES

Preparation Example 1 Active Energy Ray-Curable Composition a

To a reactor equipped with a stirrer, a reflux condenser, and a thermometer were added: 94.3 parts by mass of polypropylene glycol (number-average molecular weight: 1,000); 0.3 parts by mass of 2-hydroxyethyl acrylate; 19.5 parts by mass of 1,4-hexanedimethanol; 0.5 parts by mass of 2,6-di-tert-butylcresol; 0.1 parts by mass of p-methoxyphenol; and 57.4 parts by mass of ethyl acetate.

After the temperature in the reactor was increased to 40° C., 50.3 parts by mass of isophorone diisocyanate was added.

Next, 0.01 parts by mass of dioctyltin dineodecanoate was added, and the temperature was increased to 75° C. over 1 hour and held at 75° C. for 12 hours. Then, 51.7 parts by mass of ethyl acetate was added, and the mixture was stirred for 30 minutes until uniform and cooled to produce a polyurethane composition (solid content: 48 mass %).

To a reactor equipped with a stirrer and a thermometer were added: 100 parts by mass of the polyurethane composition (solid content: 48 mass %); 0.62 parts by mass of "Burnock D-100S" (available from DIC Corporation, a nurate of hexamethylene diisocyanate); 9.6 parts by mass of "Aronix M-309" (available from Toagosei Co., Ltd., trimethylolpropane triacrylate); 0.14 parts by mass of "Irgacure 184" (available from BASF Japan, 1-hydroxycyclohexylphenyl ketone photopolymerization initiator, solid content: 100 mass %); and 0.004 parts by mass of dioctyltin dineodecanoate. The mixture was stirred to produce an active energy ray-curable composition a.

Preparation Example 2 Curable Resin Composition b

An active energy ray-curable composition b was prepared by using the same method as in Preparation Example 1 except that the amount of D-100S used was changed from 0.62 parts by mass to 1.86 parts by mass, and the amount of Irgacure 184 used was changed from 0.14 parts by mass to 0.56 parts by mass.

<Adhesive Composition c>

To a reactor equipped with a stirrer, a reflux condenser, a nitrogen introduction pipe, and a thermometer were added: 75.94 parts by mass of n-butyl acrylate; 5 parts by mass of 2-ethylhexyl acrylate; 15 parts by mass of cyclohexyl acrylate; 4 parts by mass of acrylic acid; 0.06 parts by mass of 4-hydroxybutyl acrylate; and 200 parts by mass of ethyl acetate. The mixture was heated to 65° C. under stirring while the reactor was purged with nitrogen.

Next, to the mixture added was 4 parts by mass (solid content: 2.5 mass %) of a solution of 2,2'-azobisisobutyronitrile in ethyl acetate. The mixture was held at 65° C. for 10 hours under stirring.

Next, the mixture was filtered through a 200-mesh metal net to produce a solution (nonvolatile content: 31 mass %) of an acrylic polymer (A-1) having a weight-average molecular weight of 1,600,000.

To 100 parts by mass of the acrylic polymer (A-1) added were: 10 parts by mass of polymerized rosin ester-based tackifier resin D-125 (available from Arakawa Chemical Industries, Ltd.); 5 parts by mass of ununiform rosin ester-based tackifier resin A-125 (available from Arakawa Chemical Industries, Ltd.); 15 parts by mass of petroleum-based tackifier resin FTR 6125 (available from Mitsui Chemicals, Inc.); 1.1 parts by mass of "Burnock NC-40" (available from DIC Corporation, polyisocyanate prepolymer); and 100 parts by mass of ethyl acetate, whereby an adhesive composition having 15 mass % of solid content was prepared.

Example 1

The active energy ray-curable composition a was applied to the surface of a polyethylene terephthalate film having a thickness of 50 μm and serving as a base material such that the thickness of an active energy ray-curable layer a after drying was 25 μm. The active energy ray-curable composition a was then dried at 85° C. for 3 minutes to form an active energy ray-curable layer a.

Next, the adhesive composition c was applied to a release liner (a release-treated polyethylene terephthalate film with a thickness of 25 μm) such that the thickness of an adhesive layer after drying was 1 μm. The adhesive composition c was then dried at 85° C. for 1 minute to form an adhesive layer.

Next, the adhesive layer and the active energy ray-curable layer a were attached to each other to produce an easily peelable adhesive tape.

Example 2

An easily peelable adhesive tape was produced by using the same method as in Example 1 except that the thickness of the active energy ray-curable layer a was changed from 25 μm to 15 μm.

Example 3

An easily peelable adhesive tape was produced by using the same method as in Example 1 except that the thickness of the active energy ray-curable layer a was changed from 25 μm to 10 μm.

Example 4

An easily peelable adhesive tape was produced by using the same method as in Example 1 except that the thickness of the active energy ray-curable layer a was changed from 25 μm to 50 μm.

Example 5

An easily peelable adhesive tape was produced by using the same method as in Example 1 except that the active energy ray-curable composition a was replaced by the active energy ray-curable composition b.

Comparative Example 1

The adhesive composition c was applied to the surface of a polyethylene terephthalate film having a thickness of 50 μm and serving as a base material such that the thickness of an adhesive layer after drying was 1 μm. The adhesive composition c was dried at 85° C. for 1 minute to produce an adhesive tape.

Comparative Example 2

The adhesive composition c was applied to the surface of a polyethylene terephthalate film having a thickness of 50 μm and serving as a base material such that the thickness of an adhesive layer after drying was 26 μm. The adhesive composition c was dried at 85° C. for 3 minutes to produce an adhesive tape.

Comparative Example 3

The active energy ray-curable composition a was applied to the surface of a polyethylene terephthalate film having a thickness of 50 μm and serving as a base material such that the thickness of an active energy ray-curable layer a after drying was 26 μm. The active energy ray-curable composition a was dried at 85° C. for 3 minutes to produce an adhesive tape.

[Method for Measuring Storage Modulus]

The storage modulus of the active energy ray-curable layer and the adhesive layer in the adhesive tape or the like at a given temperature was obtained using a viscoelasticity testing machine (available from Rheometrics, Inc., product name: ARES-2KSTD) as follows: placing a test piece between parallel disks in a measuring unit of the testing machine; and measuring the storage modulus (G') at a temperature of 25° C. and a frequency of 1 Hz. The test piece used in the measurement was a test piece obtained by cutting the active energy ray-curable layer and the adhesive layer in a circular shape having a size of 1 mm in thickness and 8 mm in diameter.

[Method for Evaluating Adhesive Strength and Ease of Disassembling]

In an atmosphere at 23° C. and 50% RH, a cut piece 25 mm×35 mm of the adhesive tape was attached to a hairline-finish SUS sheet having the polished surface such that the attachment area was 25 mm×25 mm, and the cut piece and the hairline-finish SUS sheet were pressure-bonded to each other by moving a hand roller 2 kg on the upper surface back and forth one time so as to remove air in the interface.

The pressure-bonded product was left to cure in an atmosphere at 23° C. and 50% RH for 24 hours. A sample of the adhesive tape that was irradiated with ultraviolet rays at 1000 mJ/cm$^2$ and a sample of the adhesive tape that was not irradiated with ultraviolet rays were produced.

An attempt to peel the adhesive tape off was made by pulling the adhesive tape by hand at an angle of 135° with respect to the plane of the hairline-finish SUS sheet. At this time, the peeling force was evaluated by five persons. The evaluation result determined by the majority was defined as a score for the adhesive tape.

In an atmosphere at 23° C. and 50% RH, a cut piece 25 mm×100 mm of the adhesive tape was attached to a hairline-finish SUS sheet having the polished surface, and the cut piece and the hairline-finish SUS sheet were pressure-bonded to each other by moving a hand roller 2 kg on the upper surface back and forth one time so as to remove air in the interface.

The pressure-bonded product was left to cure in an atmosphere at 23° C. and 50% RH for 24 hours. A sample of the adhesive tape that was irradiated with ultraviolet rays at 1000 mJ/cm$^2$ and a sample of the adhesive tape that was not irradiated with ultraviolet rays were produced. The 180° peel adhesive strength (peeling rate: 300 mm/min) of the samples was measured.

5: Heavy peeling, and it was very difficult to peel the adhesive tape off even by strongly pulling the adhesive tape by hand in order to peel it. (criteria: 180° adhesive strength=10 N/25 mm or more)

4: Heavy peeling, but it was able to peel the adhesive tape off by strongly pulling the adhesive tape by hand.

3: It was able to peel the adhesive tape off by pulling the adhesive tape by hand. (criteria: 180° adhesive strength=5 N/25 mm)

2: Light peeling, and it was able to peel the adhesive tape off by hand with relatively small force.

1: Light peeling, and it was able to peel the adhesive tape off with substantially no force. (criteria: 180° adhesive strength=1 N/25 mm)

TABLE 1

|  | Storage modulus of active energy ray-curable layer before irradiation with active energy rays | Storage modulus of cured material layer after irradiation with active energy rays |
|---|---|---|
| Active energy ray-curable composition a | 2.6 × 10$^5$ Pa | 2.5 × 10$^6$ Pa |
| Active energy ray-curable composition b | 2.7 × 10$^5$ Pa | 2.1 × 10$^6$ Pa |
| Adhesive composition c | 1.2 × 10$^5$ Pa | 1.2 × 10$^5$ Pa |

TABLE 2

|  | Active energy ray-curable layer | Adhesive layer | Thickness of active energy ray-curable layer | Thickness of adhesive layer | Adhesive strength, Ease of disassembling Before irradiation with ultraviolet rays | After irradiation with ultraviolet rays |
|---|---|---|---|---|---|---|
| Example 1 | a | c | 25 μm | 1 μm | 5 | 1 |
| Example 2 | a | c | 15 μm | 1 μm | 4 | 1 |
| Example 3 | a | c | 10 μm | 1 μm | 4 | 2 |
| Example 4 | a | c | 50 μm | 1 μm | 5 | 1 |
| Example 5 | b | c | 25 μm | 1 μm | 5 | 1 |
| Comparative Example 1 | — | c | — | 1 μm | 2 | 2 |
| Comparative Example 2 | — | c | — | 26 μm | 5 | 5 |
| Comparative Example 3 | a | — | 26 μm | — | 2 | 1 |

As shown in Table 2, the adhesive layers of the easily peelable adhesive tapes in Examples 1 to 5 are difficult to peel off from adherends in an attempt to peel the easily peelable adhesive tapes off from the adherends. This is because the adhesive layers strongly adhere to the adherends, and the adhesive tapes themselves are relatively flexible. For the easily peelable adhesive tapes each having the cured layer famed by irradiation with active energy rays, the hardness of the adhesive tapes themselves increases with increasing hardness of the cured layer. This configuration makes it easy to remove the thin adhesive layer together with the cured layer from the surface of the adherend in an attempt to peel the easily peelable adhesive tape off from the adherend. As a result, the easily peelable adhesive tapes are easy to peel off from the adherend.

The adhesive sheets of Comparative Examples 1 to 3 are difficult to peel off because of strong adhesion to adherends and cause detachment of the adherends over time because of light peeling.

The invention claimed is:

1. An peelable adhesive tape comprising
an active energy ray-curable layer on at least one surface of a base material and
an adhesive layer on a surface side of the active energy ray-curable layer, the active energy ray-curable layer having a storage modulus ($G'_{a25}$) of less than $1.0 \times 10^6$ Pa as measured at a temperature of 25° C. and a frequency of 1.0 Hz, the active energy ray-curable layer comprises a polyurethane having a polymerizable unsaturated double bond and a (meth)acrylate compound having two to four polymerizable unsaturated double bonds, wherein an amount of the (meth)acrylate compound having two to four polymerizable unsaturated double bonds is 5 parts by mass to 30 parts by mass with respect to 100 parts by mass of the polyurethane.

2. The peelable adhesive tape according to claim 1, wherein the adhesive layer has a thickness of 3 μm or less.

3. The peelable adhesive tape according to claim 1, wherein the active energy ray-curable layer has a thickness of 10 μm or more.

4. The peelable adhesive tape according to claim 1, wherein the base material has a thickness of 25 μm or more.

5. The peelable adhesive tape according to claim 1, wherein the active energy ray-curable layer further comprises a polyisocyanate.

6. The peelable adhesive tape according to claim 5, wherein the polyisocyanate is selected from the group consisting of tolylene diisocyanate, chlorophenylene diisocyanate, hexamethylene diisocyanate, tetramethylene diisocyanate, xylylene diisocyanate, isophorone diisocyanate, diphenylmethane diisocyanate, and hydrogenated diphenylmethane diisocyanate.

7. The peelable adhesive tape according to claim 6, wherein an amount of the polyisocyanate is from 0.5 parts by mass to 7 parts by mass with respect to 100 parts by mass of the polyurethane.

8. The peelable adhesive tape according to claim 1, the (meth)acrylate compound having two to four polymerizable unsaturated double bonds is selected from the group consisting of poly(ethylene glycol) di(meth)acrylate, tripropylene glycol di(meth)acrylate, neopentyl glycol hydroxypivarate di(meth)acrylate, ditrimethylolpropane tetra(meth)acrylate, neopentyl glycol di(meth)acrylate, 1,6-hexanediol di(meth)acrylate, trimethylolpropane tri(meth)acrylate, pentaerythritol tri(meth)acrylate, pentaerythritol tetra(meth)acrylate, and (meth)acrylate esters of sugar alcohols.

9. The peelable adhesive tape according to claim 1, wherein the thickness of the active energy ray-curable layer is from 25 μm to 50 μm.

10. The peelable adhesive tape according to claim 1, wherein the thickness of the adhesive layer is 3 μm or less and 0.5 μm or more.

11. The peelable adhesive tape according to claim 1, wherein the adhesive layer comprises an acrylic polymer.

12. The peelable adhesive tape according to claim 11, wherein the weight-average molecular weight of the acrylic polymer is from 600,000 to 1,800,000.

13. The peelable adhesive tape according to claim 1, wherein the adhesive layer comprises a (meth)acrylate having an alkyl group with 2 to 14 carbon atoms.

14. The peelable adhesive tape according to claim 13, wherein the (meth)acrylate having an alkyl group with 2 to 14 carbon atoms is selected from the group consisting of ethyl acrylate, n-propylacrylate, isopropyl acrylate, n-butyl acrylate, sec-butyl acrylate, t-butyl acrylate, n-hexyl acrylate, cyclohexyl acrylate, n-octyl acrylate, isooctyl acrylate, 2-ethylhexyl acrylate, isononyl acrylate, isodecyl acrylate, lauryl acrylate, methyl methacrylate, ethyl methacrylate, n-propyl methacrylate, isopropyl methacrylate, n-butyl methacrylate, sec-butyl methacrylate, t-butyl methacrylate, n-hexyl methacrylate, cyclohexyl methacrylate, n-octyl methacrylate, isooctyl methacrylate, 2-ethylhexyl methacrylate, isononyl methacrylate, isodecyl methacrylate, and lauryl methacrylate.

15. The peelable adhesive tape according to claim 13, wherein the adhesive layer further comprises a crosslinking agent.

16. The peelable adhesive tape according to claim 1, wherein the total thickness of the peelable adhesive tape is from 50 μm to 250 μm.

17. The peelable adhesive tape according to claim 1, wherein the peel adhesive strength at 180° at a peeling rate of 300 mm/min is 5 N/25 mm or less.

18. An article in which the adhesive layer of the peelable adhesive tape according to claim 1 is attached to an adherend.

19. A method for disassembling an article, the method comprising: a step of irradiating the peelable adhesive tape of the article according to claim 18 with active energy rays to cure the active energy ray-curable layer into a cured layer having a storage modulus ($G'_{b25}$) of $1.0 \times 10^6$ Pa or more as measured at a temperature of 25° C. and a frequency of 1.0 Hz; and a step of peeling the peelable adhesive tape having the cured layer from the adherend.

20. The method of claim 19, wherein the active energy rays are ultraviolet rays.

* * * * *